(12) United States Patent
Cheng et al.

(10) Patent No.: US 11,565,315 B2
(45) Date of Patent: Jan. 31, 2023

(54) SIMULATING MELT POOL CHARACTERISTICS FOR SELECTIVE LASER MELTING ADDITIVE MANUFACTURING

(71) Applicant: Robert Bosch GmbH, Stuttgart (DE)

(72) Inventors: Bo Cheng, Malden, MA (US); Charles Tuffile, Swansea, MA (US)

(73) Assignee: Robert Bosch GmbH, Stuttgart (DE)

( * ) Notice: Subject to any disclaimer, the term of this patent is extended or adjusted under 35 U.S.C. 154(b) by 1039 days.

(21) Appl. No.: 16/237,125

(22) Filed: Dec. 31, 2018

(65) Prior Publication Data

US 2020/0206814 A1 Jul. 2, 2020

(51) Int. Cl.
| | | |
|---|---|---|
| *B22F 3/105* | (2006.01) | |
| *B29C 64/153* | (2017.01) | |
| *B28B 1/00* | (2006.01) | |
| *B29C 64/268* | (2017.01) | |
| *B33Y 30/00* | (2015.01) | |
| *B33Y 10/00* | (2015.01) | |

(52) U.S. Cl.
CPC ............. *B22F 3/105* (2013.01); *B28B 1/001* (2013.01); *B29C 64/153* (2017.08); *B29C 64/268* (2017.08); *B33Y 10/00* (2014.12); *B33Y 30/00* (2014.12)

(58) Field of Classification Search
CPC ..... B28B 1/001; B29C 64/153; B29C 64/268; B29C 64/393; B22F 10/20; B22F 10/30; B22F 3/105; B33Y 10/00; B33Y 30/00; B33Y 50/02; G06F 2113/10; G06F 30/20; Y02P 10/25
See application file for complete search history.

(56) References Cited

U.S. PATENT DOCUMENTS

| | | |
|---|---|---|
| 9,573,224 B2 | 2/2017 | Sparks |
| 9,776,282 B2 | 10/2017 | Subramanian et al. |
| 10,112,262 B2 | 10/2018 | Cheverton et al. |
| 2015/0090074 A1 | 4/2015 | Etter et al. |
| 2016/0041111 A1* | 2/2016 | Beuth ................... B23K 31/12 702/130 |
| 2017/0304895 A1 | 10/2017 | Porch et al. |
| 2018/0345382 A1 | 12/2018 | Roychowdhury et al. |
| 2019/0070787 A1* | 3/2019 | Higgs, III ............. B33Y 50/02 |
| 2020/0019661 A1* | 1/2020 | Spaltmann ............. G06F 30/23 |

\* cited by examiner

*Primary Examiner* — Dana Ross
*Assistant Examiner* — Joe E Mills, Jr.
(74) *Attorney, Agent, or Firm* — Michael Best & Friedrich LLP

(57) ABSTRACT

Systems and methods for simulating a melt pool characteristic for selective laser melting additive manufacturing. The system includes a selective laser melting apparatus and an electronic controller configured to obtain a surface geometry of a previous layer of a component being manufactured using the selective laser melting apparatus, simulate an addition of a powder layer having a desired powder layer thickness to the component based upon the surface geometry of the previous layer, determine a melt pool characteristic based upon geometric information of the simulated powder layer and the desired powder layer thickness, determine an adjustment to the simulated powder layer based upon the melt pool characteristic, and actuate the selective laser melting apparatus based upon the simulated powder layer and the determined adjustment.

18 Claims, 9 Drawing Sheets
(1 of 9 Drawing Sheet(s) Filed in Color)

Solidified previous powder layer after laser scanning

Lowering the previous solidified layer by a certain distance to allow new powder layer spreading

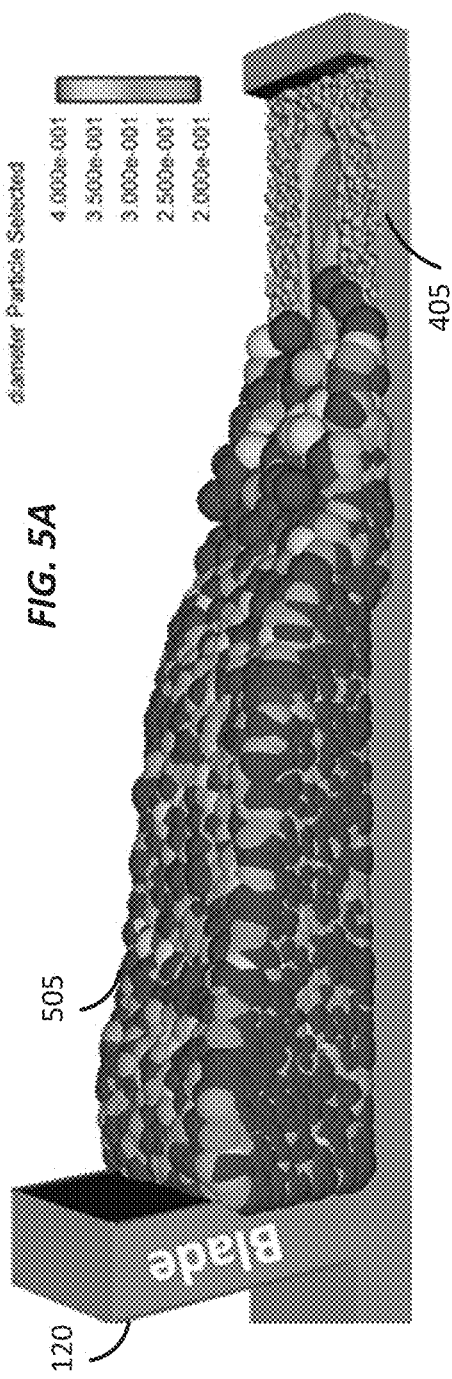

SIMULATING MELT POOL CHARACTERISTICS FOR SELECTIVE LASER MELTING ADDITIVE MANUFACTURING

FIELD

Embodiments relate to a system and method for simulating a melt pool characteristic for selective laser melting additive manufacturing.

BACKGROUND

Selective Laser Melting ("SLM") is a manufacturing technology that is capable of building complex components with nearly full density. The key feature of SLM is the layer-by-layer fabrication of complicated shapes that are difficult to make using traditional manufacturing methods, such as casting and machining. In the SLM process, digital information of the desired part, such as a computer-aided design ("CAD") model, is sliced into many layers. The laser beam scans a metallic powder bed layer in a way defined by the CAD model to form the layers of the part that is being fabricated. The laser beam irradiates the top surface of the power bed, locally melting the powders and creating a melting pool. With repeated heating and cooling and solidification cycles, the part is fabricated.

There are significant challenges in using the SLM fabrication process. Parts fabricated using SLM frequently encounter build defects such as local porosity and layer delamination. It is well known that melt pool characteristics and powder layer thickness have a significant influence on part quality and any defects created during the fabrication process. During a normal fabrication process, the powder layer thickness is a constant value, pre-selected before initiation of part fabrication. Adjusting the powder layer thickness can be challenging, because the powder layer thickness influences melt pool characteristics.

SUMMARY

Therefore, a system is needed for simulating melt pool characteristics to better control SLM manufacturing by adjusting a desired powder layer thickness. When a powder layer is simulated, the melt pool characteristics can be determined, which allows for better control of SLM manufacturing.

One embodiment provides a system for simulating a melt pool characteristic for selective laser melting additive manufacturing. The system includes a selective laser melting apparatus and an electronic controller configured to obtain a surface geometry of a previous layer of a component being manufactured using the selective laser melting apparatus, simulate an addition of a powder layer having a desired powder layer thickness to the component based upon the surface geometry of the previous layer, determine a melt pool characteristic based upon geometric information of the simulated powder layer and the desired powder layer thickness, determine an adjustment to the simulated powder layer based upon the melt pool characteristic, and actuate the selective laser melting apparatus based upon the simulated powder layer and the determined adjustment.

Another embodiment provides a method for simulating a melt pool characteristic for selective laser melting additive manufacturing. The method includes obtaining, with an electronic controller, a surface geometry of a previous layer of a component being manufactured using a selective laser melting apparatus; simulating, with the electronic controller, an addition of a new powder layer having a desired powder layer thickness to the component based upon the surface geometry of the previous layer; determining, with the electronic controller, a melt pool characteristic based upon geometric information of the simulated new powder layer and the desired powder layer thickness; determining, with the electronic controller, adjustment to the simulated new powder layer based upon the melt pool characteristic; and actuating, with the electronic controller, the selective laser melting apparatus based upon the simulated new powder layer and the determined adjustment.

Other aspects, features, and embodiments will become apparent by consideration of the detailed description and accompanying drawings.

BRIEF DESCRIPTION OF THE DRAWINGS

This patent or application file contains at least one drawing executed in color. Copies of this patent or patent application publication with color drawing(s) will be provided by the U.S. Patent and Trademark Office upon request and payment of the necessary fee.

FIG. 5A is a drawing illustrating a simulated powder layer spreading according to one embodiment.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
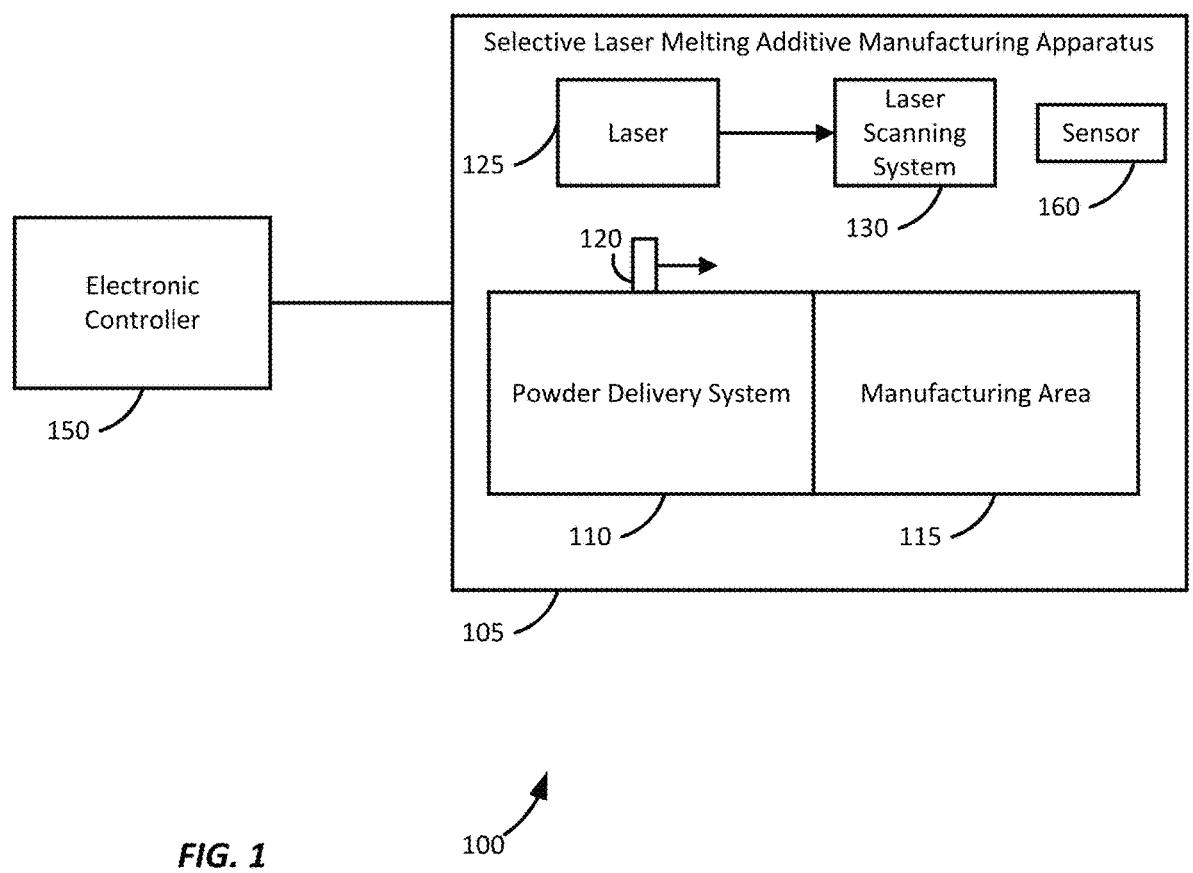
FIG. 1 is a schematic illustrating a system for simulating a melt pool characteristic for selective laser melting additive manufacturing according to one embodiment.

FIG. 1 is a schematic illustrating a system 100 for simulating a melt pool characteristic for selective laser melting additive manufacturing according to one embodiment. The system 100 includes a selective laser melting apparatus 105, which includes a powder delivery system 110, a manufacturing area 115, a blade 120, a laser 125, and a laser scanning system 130.

The powder delivery system 110 delivers layers of metal powder to the manufacturing area 115 by using the blade 120 to push the layers of metal powder at a desired layer thickness from the powder delivery system 110 to the manufacturing area 115. The desired layer thickness is controlled, in some embodiments, by raising or lowering the blade 120 to a desired height. The manufacturing area 115 allows the layers of metal powder (and any melted portions, as discussed below) to be lowered by means of a mechanical element (such as a piston).

The metal powder may include, but is not limited to, powder of H13 steel, steel, Inconel 718, and Ti-6Al-4V, and combinations thereof.

Once the layers of metal powder are within the manufacturing area 115, the laser 125 provides a high power laser beam (usually a laser beam with hundreds of watts, a laser speed, and a laser diameter) to the laser scanning system 130, which utilizes scanning mirrors to direct the laser 125 in X and Y directions to melt selected portions of the metal powder. The selected portions of the metal powder that are melted are determined based upon a scanning path received at the laser scanning system. Typically, the scanning path is received as a computer-aided design ("CAD") model and is divided into layers illustrating what portions of the metal powder should be melted for each layer. The portions melted for each layer are based upon the layer thickness of the metal powder (for example, each layer in the CAD model has the same thickness as the current metal powder layer to ensure that the correct portions of the metal powder are melted to create the correct canning path).

Figure 2:
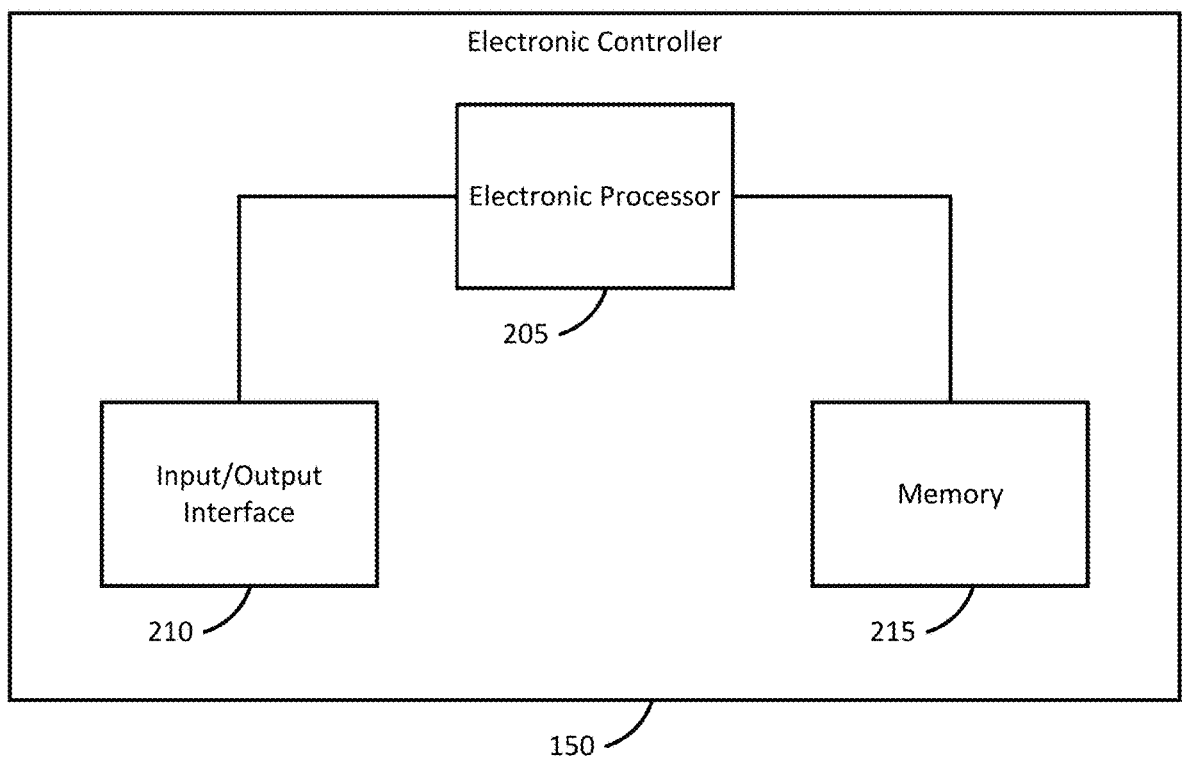
FIG. 2 is a schematic illustrating an electronic controller according to one embodiment.

The system 100 also includes an electronic controller 150 electronically connected to the selective laser melting apparatus 105. An example of the electronic controller 150 is illustrated in FIG. 2.

The electronic controller 150 includes an electronic processor 205, an input/output interface 210, and a memory 215. The electronic processor 205 executes instructions to, among other things, perform the methods as described herein and may be a microprocessor, an application-specific integrated circuit, and the like. The electronic processor 205 is electronically connected to the input/output interface 210 and the memory 215. The input/output interface 210 allows the electronic controller 150 to communicate with other electronic components of the system 100 (such as the selective laser melting apparatus 105). The memory 215 is a non-transitory, computer-readable memory medium that stores data and instructions executable by the electronic processor 205.

In some embodiments, the electronic controller 150 is integrated into the selective laser melting apparatus 105. In other embodiments, the electronic controller 150 is a separate component of the system 100. It is to be understood that the functionality of the electronic controller 150 may be divided between a plurality of electronic processors, input/output interfaces, and memories.

Returning now to FIG. 1, the system 100 may also include a sensor 160. The sensor 160 is configured to capture data of a solidified layer of metal and a new metal powder layer and transmit the data to the electronic controller 150. In some embodiments, the functionality of the sensor 160 is performed by a component of the laser scanning system 130. The data may be captured as images or as other signals (such as lidar, infrared, or the like) by the sensor 160.

Figure 3:
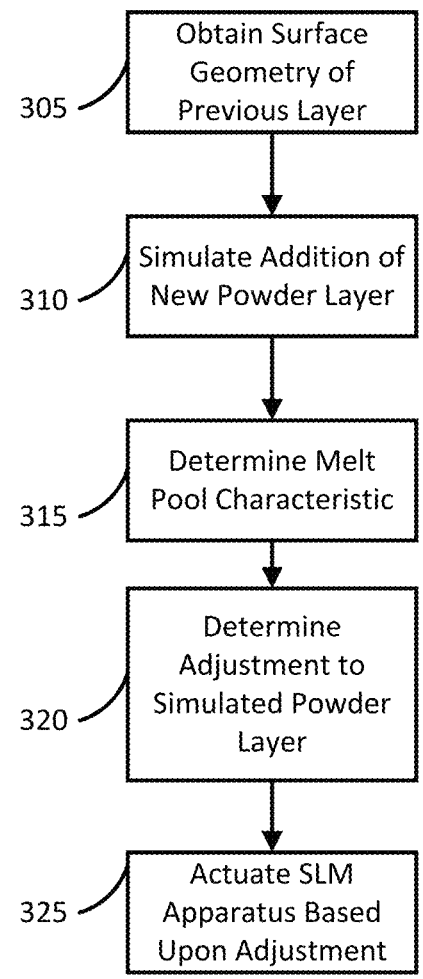
FIG. 3 is a flow chart illustrating a method for simulating a melt pool characteristic for selective laser melting additive manufacturing according to one embodiment.

FIG. 3 illustrates a method 300 of simulating a melt pool characteristic for selective laser melting additive manufacturing according to one embodiment.

Figure 4A:
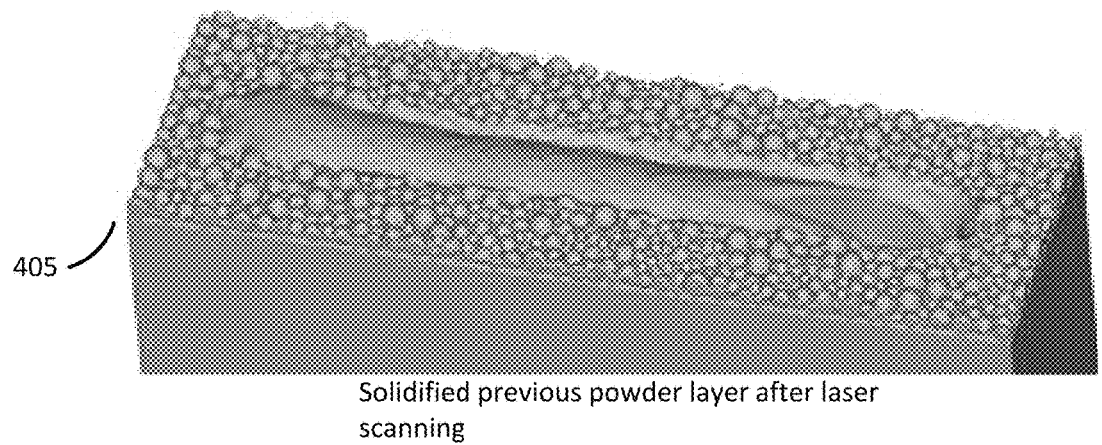
FIG. 4A is a drawing illustrating a previously solidified layer of a component being manufactured according to one embodiment.
Figure 4B:
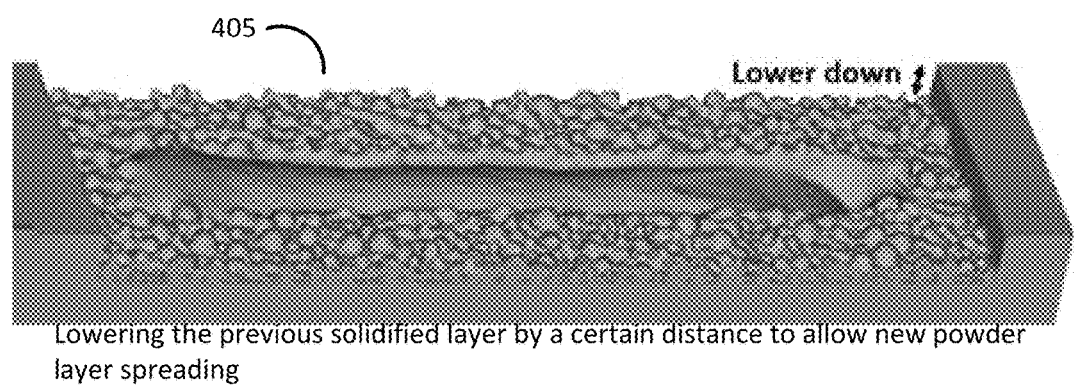
FIG. 4B is a drawing illustrating a lowering of a previously solidified layer of a component being manufactured according to one embodiment.

The method 300 includes obtaining, at the electronic controller 150, a surface geometry of a previously solidified layer of a component being manufactured by the selective laser melting apparatus 105 (at block 305). For example, the electronic controller 150 receives data from the sensor 106 indicating the surface geometry of the previously solidified layer. FIG. 4A illustrates a previously solidified layer 405 of the component being manufactured. FIG. 4B illustrates that, once the surface geometry of the previously solidified layer 405 is determined, the previously solidified layer 405 may be lowered in the manufacturing area 115 (by way of a mechanical element of the manufacturing area, such as a piston) to allow a new powder layer to be spread over the previously solidified layer 405.

The method 300 also includes simulating, with the electronic controller 150, an addition of a new powder layer having a desired powder layer thickness to the component being manufactured based upon the surface geometry of the previously solidified layer 405 (at block 310). The addition of the new powder layer is simulated using a discrete element method ("DEM") model, which is a family of numerical methods for computing the motion and effect of a large number of small particles, such as the new powder layer. The desired powder layer thickness is an initial value given to the powder layer thickness of the new powder layer for simulation purposes.

FIG. 5A illustrates the blade 120 spreading a new powder layer 505 over the previously solidified layer 405. The blade 120 is moved at a given translational speed and is set at a given height to spread the new powder layer 505 at the desired powder layer thickness (for example, 20 micrometers).

Figure 5B:
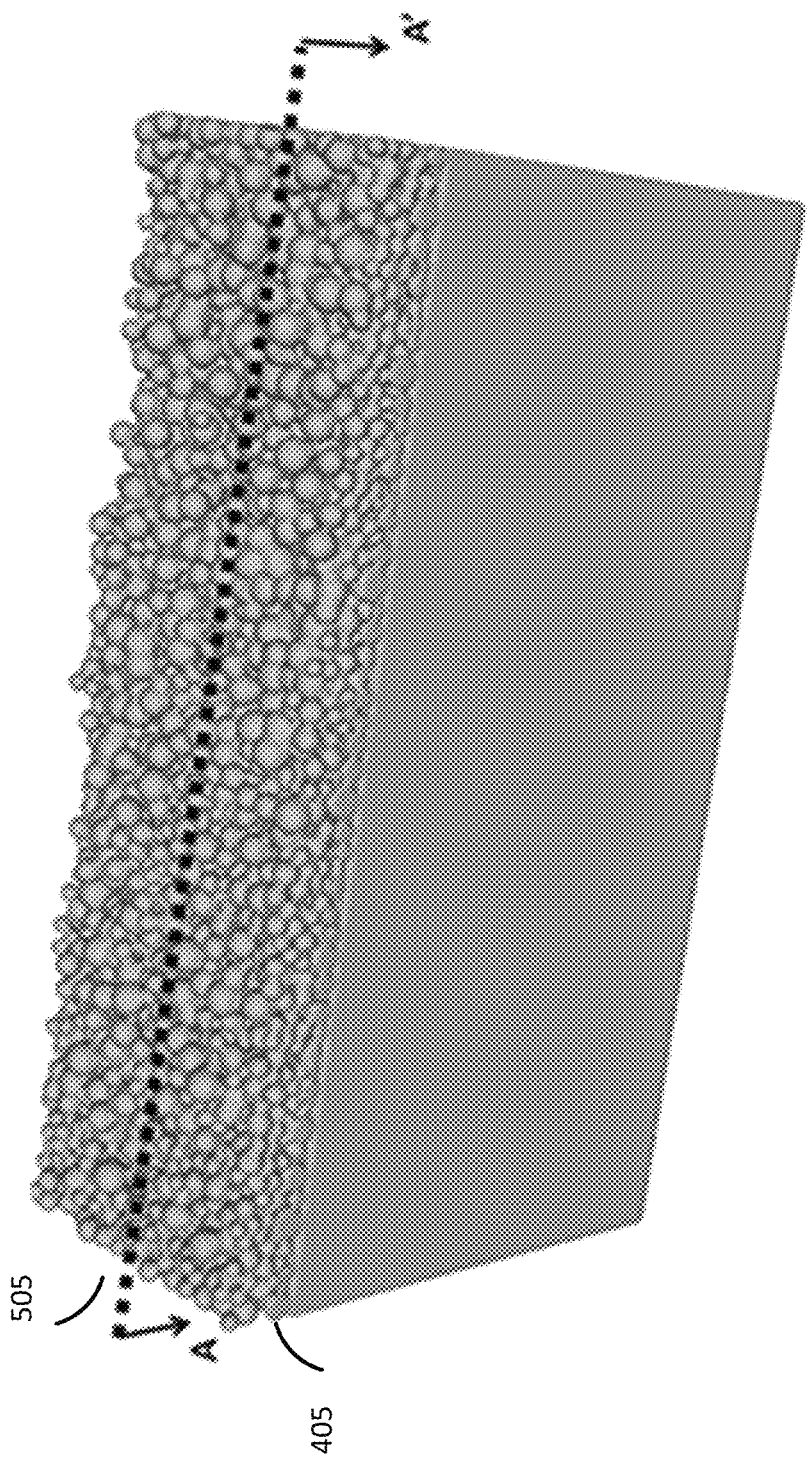
FIG. 5B. is a drawing illustrating a simulated powder layer once spreading has occurred according to one embodiment.

FIG. 5B illustrates the new powder layer 505 spread over the previously solidified layer 405 after spreading has occurred. Once powder layer spreading has occurred, the electronic controller 150 is configured to gather geometric data about the new powder layer 505 using, for example, the sensor 160.

Figure 5C:
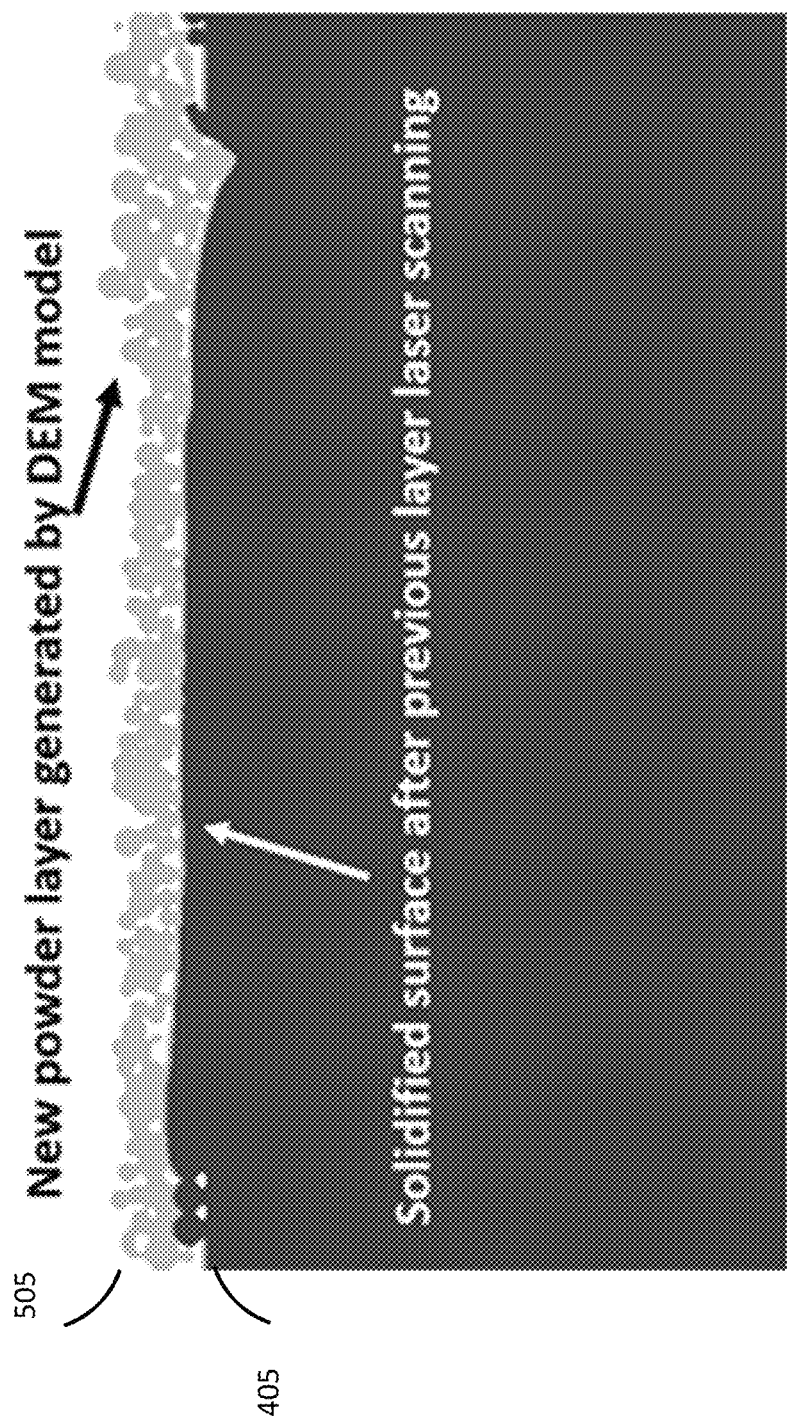
FIG. 5C is a drawing illustrating a simulated powder spread over a previously solidified layer after spreading has occurred according to one embodiment.

FIG. 5C illustrates a different view of the new powder 505 spread over the previously solidified layer 405 after spreading has occurred.

The method 300 includes determining, with the electronic controller 150, a melt pool characteristic based upon the geometric information of the simulated new powder layer 505 and the desired powder layer thickness (at block 315).

The melt pool characteristic may be a melt pool dimension, such as length, width, depth, or volume.

The electronic controller 150 determines the melt pool characteristic using a complex thermal fluid ("CFD") model. The CFD model uses a moving Gaussian heat source, material phase transformation information, surface tension force, evaporation pressure, and thermal fluid properties. The powder layer thickness of the new powder layer 505 (e.g., the desired powder layer thickness) significantly affects the powder bed heat transfer, which governs melt pool evolution in the SLM process.

Figure 6B:
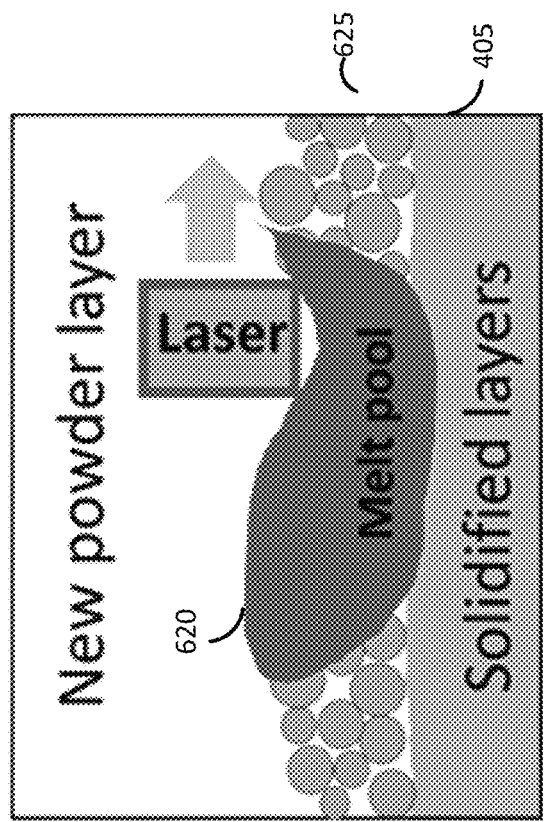
FIG. 6B is a drawing illustrating a melt pool created with a thick powder layer according to one embodiment.
Figure 6A:
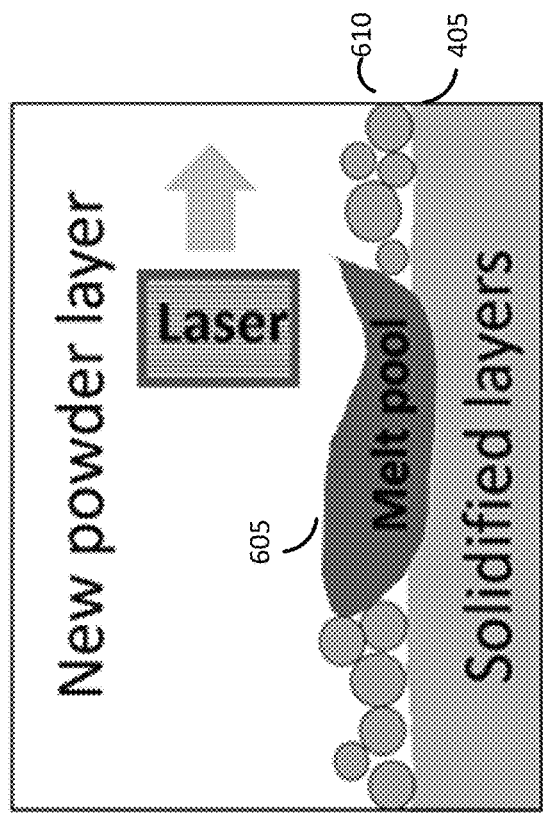
FIG. 6A is a drawing illustrating a melt pool created with a thin powder layer according to one embodiment.

For example, FIG. 6A illustrates a melt pool 605 made with a thin powder layer 610 on top of the previously solidified layer 405. As the laser 125 (via the laser scanning system 130) passes over the thin powder layer 610, the melt pool 605 is formed.

FIG. 6B illustrates a second melt pool 620 made with a thick powder layer 625 on top of the previously solidified layer 405. As shown, with a thicker powder layer, a larger melt pool is formed.

Figure 7:
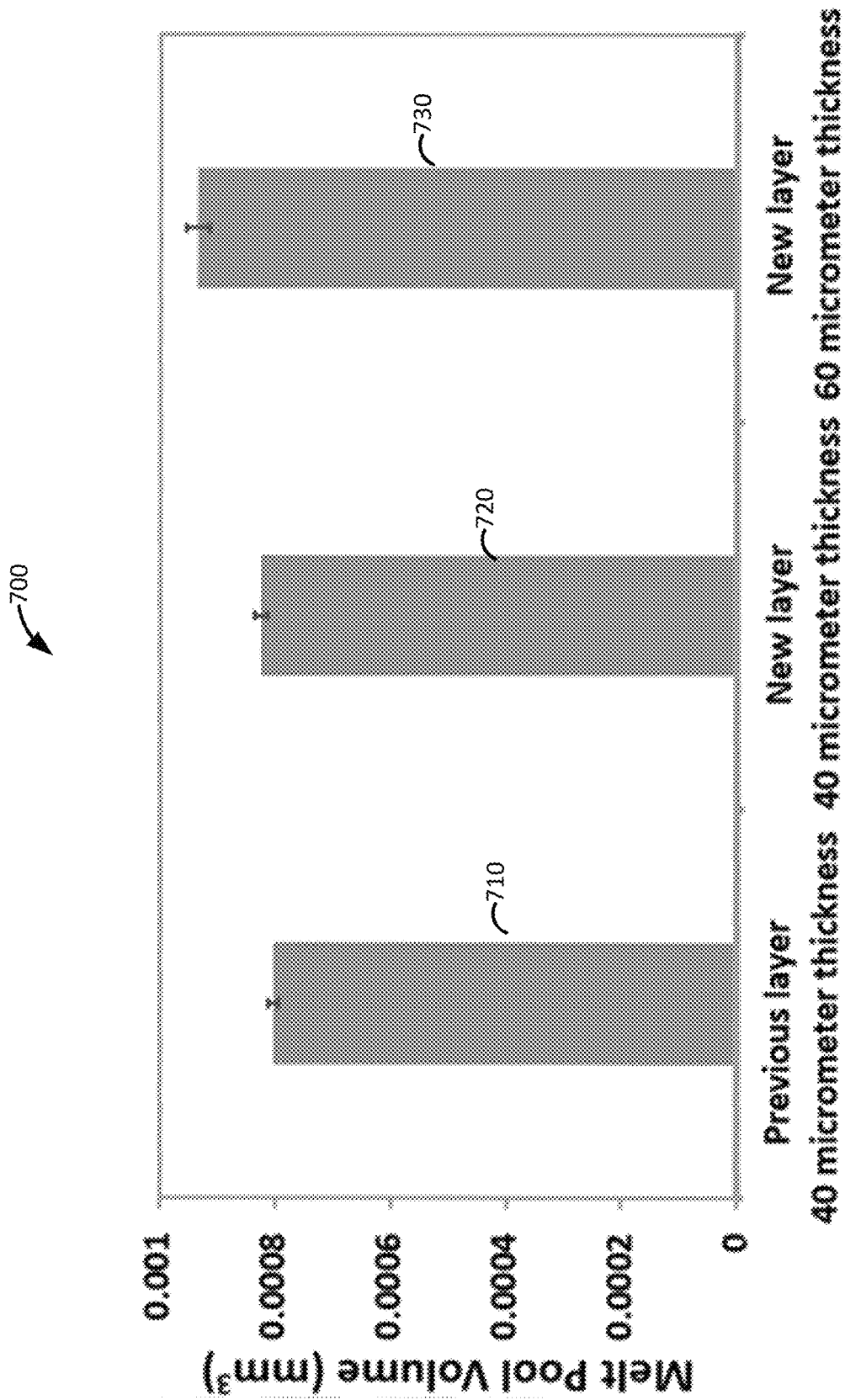
FIG. 7 is a bar chart illustrating melt pool volume for various layers.

FIG. 7 illustrates a chart 700 showing examples of melt pool volumes based upon the powder layer thickness. First bar 710 shows a melt pool volume of the previously solidified layer 405. If the new powder layer 505 has the same powder layer thickness as the previously solidified layer 405, the change in melt pool volume is negligible, although some change is possible due to tolerances and error (see second bar 720). In contrast, if the new powder layer 505 has a larger powder layer thickness, the volume of the melt pool created is much larger (see third bard 730). By controlling the powder layer thickness The electronic controller 150 may further determine the melt pool characteristic based upon a parameter of the laser 125, such as laser power, laser speed, and laser diameter.

The method 300 also includes determining, with the electronic controller 150, an adjustment to the simulated new powder layer 505 based upon the melt pool characteristic (at block 320). For example, if a smaller melt pool volume is required for a smaller layer (according to a scanning plan from the CAD model), the electronic controller 150 determines that a lesser desired powder layer thickness is needed. In contrast, if a larger melt pool volume is necessary, the electronic controller 150 determines that a larger desired powder layer thickness is needed.

The method 300 includes actuating, with the electronic controller 150, the selective laser melting apparatus 105 based upon the simulated new powder layer 505 and the determined adjustment (block 325). For example, if the determined adjustment is that the simulated new powder layer 505 needs to have a smaller desired powder layer thickness, the electronic controller 150 actuates the selective laser melting apparatus 105 to apply the new powder layer 505 with the adjusted desired powder layer thickness to the component being manufactured. If no change is determined to be necessary, the electronic controller 150 actuates the selective laser melting apparatus 105 to apply the new powder layer 505 with the initial desired powder layer thickness to the component being manufactured. As described above with regards to the simulated powder layer, the blade 120 is moved at a given height and a given translational speed to apply the new powder layer 505. By doing this, individual layers of the component can be better manufactured, as the melt pool needed to create the layer from the powder is dynamically adjusted based upon the powder layer thickness, allowing for better control of the manufacturing of the component.

Therefore, embodiments herein provide a system and method for simulating a melt pool characteristic for selective laser melting additive manufacturing.

Various features, advantages, and embodiments are set forth in the following claims.

What is claimed is:

1. A system for simulating a melt pool characteristic for selective laser melting additive manufacturing, the system comprising:
    a selective laser melting additive manufacturing apparatus, and
    an electronic controller configured to
        obtain a surface geometry of a previous layer of a component being manufactured using the selective laser melting additive manufacturing apparatus;
        simulate an addition of a new powder layer having a desired powder layer thickness to the component based upon the surface geometry of the previous layer;
        determine a melt pool characteristic based upon geometric information of the simulated new powder layer and the desired powder layer thickness, wherein the melt pool characteristic is a dimension of a melt pool;
        determine an adjustment to the simulated new powder layer based upon the melt pool characteristic; and
        actuate the selective laser melting additive manufacturing apparatus based upon the simulated new powder layer and the determined adjustment.

2. The system of claim 1, wherein the electronic controller is further configured to actuate the selective laser melting additive manufacturing apparatus to lower the previous layer of the component being manufactured to allow the new powder layer to be spread.

3. The system of claim 1, wherein the addition of the new powder layer is simulated using a discrete element method model.

4. The system of claim 1, wherein the adjustment to the simulated new powder layer is a change in the desired powder layer thickness of the simulated powder layer.

5. The system of claim 1, wherein actuating the selective laser melting additive manufacturing apparatus includes applying the new powder layer to the component being manufactured based upon the adjustment and the simulated new powder layer.

6. The system of claim 5, wherein the new powder layer is applied to the component by moving a blade of the selective laser melting additive manufacturing apparatus at a given translational speed.

7. The system of claim 5, wherein the adjustment is a new desired powder layer thickness and the new powder layer is applied with the new desired powder layer thickness.

8. The system of claim 1, wherein simulating the addition of the new powder layer includes assuming the powder layer has a powder diameter distribution that is assumed to be a Gaussian distribution.

9. The system of claim 1, wherein the melt pool characteristic is further determined based upon a parameter of a laser of the selective laser melting additive manufacturing apparatus.

10. A method for simulating a melt pool characteristic for selective laser melting additive manufacturing, the method comprising:
    obtaining, with an electronic controller, a surface geometry of a previous layer of a component being manufactured using a selective laser melting additive manufacturing apparatus;

simulating, with the electronic controller, an addition of a new powder layer having a desired powder layer thickness to the component based upon the surface geometry of the previous layer;

determining, with the electronic controller, a melt pool characteristic based upon geometric information of the simulated new powder layer and the desired powder layer thickness wherein the melt pool characteristic is a dimension of a melt pool;

determining, with the electronic controller, adjustment to the simulated new powder layer based upon the melt pool characteristic; and actuating, with the electronic controller, the selective laser melting additive manufacturing apparatus based upon the simulated new powder layer and the determined adjustment.

11. The method of claim 10, further comprising acting the selective laser melting additive manufacturing apparatus to lower the previous layer of the component being manufactured to allow the simulated new powder layer to be spread.

12. The method of claim 10, wherein the addition of the new powder layer is simulated using a discrete element method model.

13. The method of claim 10, wherein the adjustment to the simulated new powder layer is a change in the desired powder layer thickness of the simulated new powder layer.

14. The method of claim 10, wherein actuating the selective laser melting additive manufacturing apparatus includes applying the new powder layer to the component being manufactured based upon the adjustment and the simulated new powder layer.

15. The method of claim 14, wherein the new powder layer is applied to the component by moving a blade of the selective laser melting additive manufacturing apparatus at a given translational speed.

16. The method of claim 14, wherein the adjustment is a new desired powder layer thickness and the new powder layer is applied with the new desired powder layer thickness.

17. The method of claim 10, wherein simulating the addition of the new powder layer includes assuming the powder layer has a powder diameter distribution that is assumed to be a Gaussian distribution.

18. The method of claim 10, wherein the melt pool characteristic is further determined based upon a parameter of a laser of the selective laser melting additive manufacturing apparatus.

* * * * *